(12) United States Patent
Guterman et al.

(10) Patent No.: US 7,534,530 B2
(45) Date of Patent: May 19, 2009

(54) LITHIUM ANODE, METHOD OF MANUFACTURING THE SAME AND LITHIUM BATTERY USING THE LITHIUM ANODE

(75) Inventors: Vladimir E. Guterman, Suwon-si (KR); Chung-Kun Cho, Suwon-si (KR); Sang-Mock Lee, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 685 days.

(21) Appl. No.: 10/990,482

(22) Filed: Nov. 18, 2004

(65) Prior Publication Data
US 2005/0118507 A1 Jun. 2, 2005

(30) Foreign Application Priority Data
Dec. 1, 2003 (KR) .................. 10-2003-0086503

(51) Int. Cl.
*H01M 4/58* (2006.01)
*H01M 4/66* (2006.01)
(52) U.S. Cl. .................. 429/231.95; 429/245
(58) Field of Classification Search ............ 429/231.95, 429/245
See application file for complete search history.

(56) References Cited

U.S. PATENT DOCUMENTS

2002/0012846 A1  1/2002  Skotheim et al.
2002/0182508 A1* 12/2002  Nimon et al. .......... 429/231.95

FOREIGN PATENT DOCUMENTS

CN    1307731      8/2001
JP    2003036842   2/2003
WO    0139302      5/2001

* cited by examiner

*Primary Examiner*—Patrick Ryan
*Assistant Examiner*—Muhammad Siddiquee
(74) *Attorney, Agent, or Firm*—H.C. Park & Associates, PLC

(57) ABSTRACT

The present invention is related to a lithium anode, a method of the manufacturing the same and a battery using the anode. The lithium anode comprises a metal layer (or alloy layer) that is inert to lithium and a metal layer (or alloy layer) that is reactive with lithium. The two layers may form a temporary protective layer on the lithium surface, thus providing a smooth surface. By obtaining the smooth surface, an upper polymer layer and an inorganic layer may be deposited without any difficulty and the adhesive force may be strong. Thus, the lithium anode according to the present invention has superior cycling characteristics and improved storage characteristics.

12 Claims, 3 Drawing Sheets

LITHIUM ANODE, METHOD OF MANUFACTURING THE SAME AND LITHIUM BATTERY USING THE LITHIUM ANODE

CROSS-REFERENCE TO RELATED APPLICATIONS

This application claims priority to Korean Patent Application No. 2003-86503, filed on Dec. 1, 2003, in the Korean Intellectual Property Office, the disclosure of which is incorporated herein in its entirety by reference.

FIELD OF THE INVENTION

The present invention relates to a lithium anode, a method of manufacturing the anode and a lithium battery using the same. Specifically, the present invention relates to a lithium anode with enhanced cycle and capacity characteristics.

BACKGROUND

The demand for light portable high performance electric devices, such as video cameras, mobile phones, and laptop computers has increased. Accordingly, much research has been conducted in order to develop batteries with enhanced cycle and capacity characteristics to be used as the driving source. In particular, rechargeable lithium batteries having three times the energy density per unit weight as conventional lead storage batteries, nickel-cadmium batteries, nickel-hydro batteries and nickel-zinc batteries, and batteries having a shorter recharging time have been developed.

In general, an electrochemical cell includes a cathode, an anode, and an electrolyte. During cell discharging, oxidation occurs at the anode and reduction occurs at the cathode. Electric charges created during the oxidation-reduction reactions migrate via the electrolyte. The electrolyte blocks the migration of electrons from the anode to the cathode or from the cathode to the anode by cutting off electric contact between the cathode and the anode. An electrolyte that is commonly used includes a multi-porous separator, electrolytic solutions and salts, and in particular, a lithium salt.

Many different solutions have been proposed for the protection of lithium anodes including coating the lithium anode with interfacial or protective layers formed from polymers, ceramics, or glass. The interfacial or protective layers, however, must be able to conduct lithium ions. For example, anode materials using a single metal (or alloy) layer in a lithium battery in which oxidation reaction occurs are disclosed in U.S. Patent Publication Nos. 2000-713997 and 2002-0182508, and U.S. Pat. No. 6,537,701. In addition, U.S. Patent Publication No. 2002-0012846 discloses the use of a single metal layer or an alloy layer as an intermediate protective layer, which is added to a multi-layer surface protective film composed of an inorganic electrically conductive material, a polymer and a metal layer.

In contrast, U.S. Patent Publication No. 2002-0012846, discloses a protective layer formed only of a metal, which is capable of forming an alloy with lithium when a vacuum deposition method is used. Although the lithium alloy is less reactive than pure lithium, it still strongly reacts with the components of the electrolyte. As a direct result, the surface of the protected anode becomes very rough, which is undesirable. In particular, less corrosion of the outer or inner metal (or alloy) layer occurs when the layer has a smooth surface than when it has a rough surface. Also, the upper inorganic layer or the polymer layer can have stronger adhesion to a smooth surface than to a rough surface.

When a metal that does not form an alloy with lithium, such as Cu and Ni, is used, a surface coating having a very smooth surface can be formed. However, if this coating film has a thickness greater than about 1000-2000 Å lithium diffusion may be prevented. Also, the lithium anode with the coating film is electrochemically less activated. Furthermore, when an external polymer layer is formed, a specific solution contacts the electrode surface. Thus, a surface film composed of a metal capable of forming an alloy with lithium does not perform as well as a protective layer for preventing corrosion when the surface film contacts a specific solution, because the concentration of the lithium in the lithium alloy is high.

Alternatively, Cu, Ni and Fe films composed of non-alloy metals with thicknesses of greater than 2000 Å are capable of protecting the lithium, but may cause deterioration of the cycling characteristics of the anode. Therefore, it may be necessary to form a temporal protective layer at the lithium surface. This layer must positively influence the anode storage and cycling behavior, and/or it must protect the lithium from corrosion during the process of forming the subsequent polymer layers. This layer must not hamper lithium dissolution and deposition during the cycling. It is desirable to have a smooth surface for such an intermediate protective layer because it has high protective properties and guarantees a good adhesion with the subsequent polymer layer or inorganic layer.

Therefore, a temporary protective layer may be formed on the lithium surface and the protective layer. This layer, however, must improve the capacity characteristics and cycling characteristics of the anode, or suppress corrosion of the lithium surface when the polymer layer is formed. However, in a cycling process, the intermediate layer should not interfere with lithium dissolution and deposition and must have a smooth surface to guarantee good protective characteristics and strong adhesion with the upper polymer layer.

Additionally, the smooth surface metal layer formed should be capable of reacting (alloying) with the lithium surface. The smooth surface may be obtained by suppressing the alloying when forming the metal layer in a vacuum deposition process.

SUMMARY OF THE INVENTION

The present invention is directed to a lithium anode, which has improved storage characteristics, cycling characteristics and capacity characteristics, and a lithium battery using the same. Furthermore, the present invention also provides a method of manufacturing the lithium anode.

In a particular aspect, a lithium anode comprising a metal lithium layer, a metal-lithium alloy layer deposited on the metal lithium layer, and a discontinuous film comprising a metal inert to lithium interposed between the metal lithium layer and the metal-lithium alloy layer is provided.

A further aspect of the present invention is directed to a method of manufacturing a lithium anode comprising loading an anode substrate onto a deposition system, heating a thermal deposition source by using a deposition boat to deposit a current collector on the anode substrate, depositing a metal lithium on the current collector, depositing a metal inert to lithium on the metal lithium, depositing a metal reactive with lithium on the metal inert to lithium, and allowing the metal lithium to settle for a predetermined period of time.

Another aspect of the present invention is related to a lithium battery comprising a cathode composed of one or more materials, which may include composite oxides, single substance sulfur, casolite in which $Li_2S_n$, where $n \geq 1$, is dissolved, organic sulfur, and $(C_2S_x)_y$, where $2.5 \leq x \leq 20$, $2 \leq y$; and an anode including a tertiary metal layer comprising lithium, a metal that is inert to lithium, and a metal that alloys with the lithium.

DETAILED DESCRIPTION OF THE INVENTION

The present invention is directed to a lithium anode and methods for manufacturing a lithium anode. Moreover, the present invention contemplates a lithium battery employing the lithium anode of the present invention. According to an embodiment of the present invention, the lithium anode comprises a plurality of metal layers which may comprise a metal (or alloy) layer inert to lithium and a metal (or alloy) layer reactive with lithium formed on a lithium core. The metal layers may form a temporary protective layer on the lithium surface. As a result, a lithium anode having enhanced capacity, storage and cycling characteristics may be provided.

Figure 1:
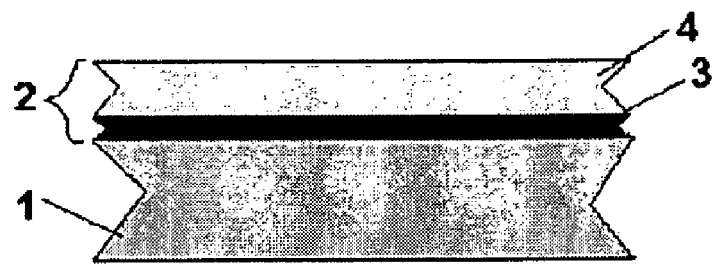
FIG. 1 is a sectional view illustrating an initial state of an anode according to an embodiment of the present invention.

Referring to FIG. 1, which illustrates an embodiment of the present invention, a lithium anode comprises a deposited lithium layer 1, and further comprises a metal or alloy layer (M1) 3 that is inert to lithium and a metal or alloy layer (M2) 4 deposited on the M1 3. The M1 3 may be a multi-porous temporary thin film whose structure breaks down after settling for a predetermined period of time. Additionally, the M2 4 may alloy with the lithium after settling for a predetermined period of time.

In general, the protective layer not only improves the storage characteristics and cycling characteristics of a lithium anode, but also prevents corrosion of lithium when a polymer layer is formed thereon. However, the protective layer should not interfere with the oxidation and reduction reactions of the lithium during cycling. In addition, the protective layer may have a smooth surface to guarantee a strong adhesion to the upper polymer layer. Therefore, a metal that is highly reactive with lithium may have a smooth surface. To obtain the smooth surface, alloying between lithium and the metal may need to be suppressed.

Thus, if the metal or alloy layer M1 3 that is almost non-reactive with lithium is interposed between the lithium layer and the metal or alloy layer M2 4 capable of alloying with lithium as a protective layer, alloying between the lithium layer and the M2 4 may be delayed for a predetermined amount of time. Therefore, the M2 4 may have a smooth surface and may have a low concentration of lithium therein. Thus, a double layer 2 including the M1 3 and the M2 4, which acts as a protective film, may protect lithium layer 1. As a result, it is much easier to deposit a polymer protective film and an inorganic protective film on the anode surface.

Figure 2:
FIG. 2 is a cross sectional view illustrating the anode of FIG. 1 after sitting for a predetermined period of time.

Referring to FIG. 2, which illustrates an embodiment of the present invention, the double layer thin film comprising the M1 and the M2 may be formed temporarily and the structure of M1 may break down after settling for a predetermined period of time. Thus, lithium may easily diffuse via open spaces in the M1 3, facilitating the gradual formation of an alloy between the lithium layer and the M2 4. Additionally, the formation of the alloy at the interface between the M1 3 and the M2 4 may lead to a change in volume, rapidly reducing the homogeneity of the M1 3. The reduced homogeneity of the M1 3 may result in an increase of lithium diffusion into the M2 4. When the charge/discharge cycle is repeated, the destruction of the M1 thin film used as a protective layer may be found even in a recently manufactured cell.

A lithium anode according to an embodiment of the present invention may comprise a metal or alloy layer M1 3 that is inert to lithium and a metal or alloy layer M2 4 that may be reactive with lithium. Examples of the metal layer that may be inert to lithium may include Cu, Ni, Fe, Ti, Cu—Ni (alloy), and Fe—Ni (alloy). Examples of the metal that may be reactive with lithium include Mg, Bi, Pb, Cd, Si, In, Ga, Ge, Zn, Al, Sn, Sb and Ag. The double layer metal thin film comprising the M1 3 and the M2 4 may be thinner than that of the metal lithium layer, and in particular, may have a thickness in the range of about 0.05 µm to about 10 µm.

Figure 3:
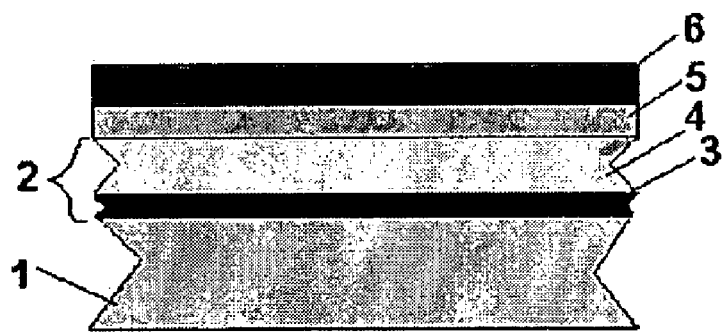
FIG. 3 is a cross sectional view illustrating an initial state of an anode according to another embodiment of the present invention.
Figure 4:
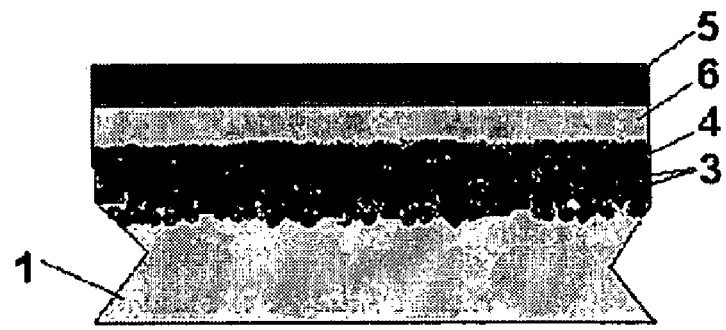
FIG. 4 is a cross sectional view illustrating the anode of FIG. 3 after sitting for a predetermined period of time.

Referring to FIG. 2, which illustrates another embodiments of the present invention, the anode may further comprise a polymer protective layer 5 and an inorganic protective layer 6 on the double layer metal thin film 2, which may be used as a protective layer for a lithium anode. FIG. 4 illustrates the anode of FIG. 3 after settling for a predetermined period of time in which lithium may be alloyed with the M2 4.

In a method of manufacturing a lithium anode according to an embodiment of the present invention, an anode substrate may be loaded onto a deposition system. The deposition source may then be heated by using a deposition boat to deposit a current collector on the anode substrate and metal lithium may be deposited on the current collector. The metal (M1) that is inert to lithium may be deposited on the metal lithium, and the metal (M2) that is reactive with lithium may be deposited on the M1. The resultant structure may then be allowed to settle for a predetermined period of time.

In the above manufacturing process, the structure of the M1 3 may break down after settling for a predetermined period of time, which may be a time period in the range of about 5 minutes to about 24 hours. If the settling time is less than about 5 minutes, the structure may be less likely to break down, thereby making it harder for the lithium ions to diffuse. If the settling time is longer than about 24 hours, an upper surface of the lithium-M2 alloy may become rough because a large amount of lithium may alloy with the M2 4. In the latter case, the adhesion force between the anode surface and subsequently formed fresh polymer layer may decrease due to the failure to maintain the smooth surface. In a specific embodiment, the settling time may be in the range of about 3 hours to about 6 hours.

A plurality of metals may be deposited on a substrate at a rate in the range of about 5 Å/s to about 100 Å/s when each layer has a thickness in the range of about 2 µm to about 5 µm. If the thickness is equal to or greater than about 5 µm, the rate may be about 100 Å/s. Examples of the metal that is inert to lithium may include Cu, Ni, Fe, Ti, Cu—Ni and Fe—Ni. Examples of the metal that is reactive with lithium may include, but is not limited to, Mg, Bi, Pb, Cd, Ge, Si, In, Ga, Zn, Al, Sn, Sb and Ag. Any current collector that is commonly used for anodes of lithium batteries may be suitable for the present invention, and the current collector may be Cu.

The deposition process may be performed on a substrate using any method known in the art, such as a gas reaction, thermal deposition, sputtering, chemical vapour deposition, chemical vapour deposition using plasma, chemical vapour deposition using a laser, ion plating, cathode arc treatment, jet vapour deposition, and laser cutting, for example. In particular, the deposition process may be performed using a gas reaction, thermal deposition or sputtering.

After depositing each metal and before another metal may be loaded, the chamber may be cooled to room temperature, and a vacuum may be formed therein. The air may be filled again in the chamber, and then a vacuum may be formed again in the chamber.

As described above, the lithium anode according to an embodiment may be suitable for lithium batteries. For example, a lithium battery may comprise a cathode which may include one or more materials such as lithium composite oxides, single substance sulfur, casolite in which $Li_2S_n$, where $n \geq 1$, is dissolved, organic sulfur, and $(C_2S_x)_y$, where $2.5 \leq x \leq 20$, $y \geq 2$, and an anode that may comprise a triple metal layer comprising lithium, the metal (M1) that is inert to lithium and where the metal (M2) forms an alloy with the lithium.

The present invention is also directed to methods for manufacturing a lithium battery. First, a cathode may be fabricated according to any conventional method of manufacturing a lithium battery. A material for a cathode, which may include an active material and a binder dissolved in a solvent, is cast on an aluminium foil, and may then be dried to obtain a cathode. The material for the cathode may further comprise a plasticizer or a conductive material. The cathode active material may include one or more compounds such as lithium composite oxides; single substance sulfur; casolite in which $Li_2S_n$, where $n \geq 1$, is dissolved; organic sulfur; and $(C_2S_x)_y$, where $2.5 \leq x \leq 20$ and $y \geq 2$.

Any lithium compound that dissociates into lithium ions in an organic solvent 20 may be a lithium salt included in an electrolytic solution according to an embodiment of the present invention. The lithium salt may be at least one ionic lithium salt, such as lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethansulfonylamide ($LiN(CF_3SO_2)_2$), for example. The concentration of the lithium salt may be in a range of about 0.5M to about 2.0M. If the concentration of the lithium salt is less than about 0.5 M or greater than about 2.0M, the ionic conductivity may be low. An organic electrolytic solution containing the inorganic salt functions as a channel for the migration of lithium ions according to the current direction.

An organic solvent included in the electrolytic solution available in the present invention may be one or more solvents including polyglymes, oxolanes, carbonates, 2-fluorobenzen, 3-fluorobenzen, 4-fluorobenzen, dimethoxyethane, and diethoxyethan. Examples of the polyglymes may include diethyleneglycol dimethylether ($CH_3(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_3OCH_3$), and triethyleneglycol diethylether ($C_2H_5(OCH_2CH_2)_3OC_2H_5$). In addition, examples of the dioxolanes may include 1,3-dioxolane, 4,5-diethyl-dioxolane, 4,5-dimethyl-dioxolane, 4-methyl-1,3-dioxolane, and 4-ethyl-1,3-dioxolane. Examples of the carbonates may include methylene carbonate, ethylene carbonate, diethyl carbonate, dimethylcarbonate, γ-butyrolactone, propylene carbonate, dimethyl carbonate, methyl ethyl carbonate, diethyl carbonate, and vinylene carbonate. Moreover, examples of the organic solvent may comprise a mixture of ethylene carbonate (EC), ethyl methyl carbonate (EMC), propylene carbonate (PC) and fluorobenzen (FB); or a mixture of diglyme (DGM, also known as "diethyleneglycol dimethylether"), dimethoxyethane (DME), and 1,3-dioxolane (DOX). An amount of the solvent used may be the same amount of a solvent that is used in a conventional lithium battery.

The electrolytic solution according to an embodiment of the present invention may be used to prepare common lithium batteries. A lithium battery may comprise the electrolytic solution according to an embodiment of the present invention that may injected into a capsulated electrode assembly. The electrode assembly may comprise an anode, a cathode and a separator. A lithium battery may also comprise a polymer electrolyte containing a matrix forming polymer resin and the electrolytic solution of the present invention that may be cast on the electrodes or the separator to form an electrode assembly which is sealed in a battery case. Alternatively, the lithium battery may also comprise a polymer electrolyte forming composition containing a matrix forming resin, which is a free polymer or polymerization monomer, and the electrolytic solution of the present invention that is cast on the electrodes or the separator to form an electrode assembly that is sealed and polymerized in a battery case.

Any separator that is commonly used in lithium batteries may be used in the embodiments of the present invention, and the separator may have high water containing capacity with a low resistance to the migration of electric charges in an electrolyte. Examples of the separator may include glass fiber, polyester, TEFLON, polyethylene, polypropylene, polytetrafluoroethylene (PTFE) and any combinations thereof, which may be in non-woven fabric or woven fabric form. In particular, the separator may be a polyethylene and/or polypropylene multi-porous membrane, which has little reaction with the organic solvent and may guarantee safety.

Any material that is commonly used as a binder of an electrode plate may be used as the matrix forming polymer resin. Examples of the matrix forming polymer resin may include vinylidene fluoride/hexafluoropropylene copolymer, polyvinylidenefluoride, polyacrylonitrile, polymethylmethacrylate and any combinations thereof. The matrix forming polymer resin may further comprise a polymer filler that enhances the mechanical strength of the polymer electrolyte. Examples of the polymer filler may include silica, kaoline, and alumina. In addition, the matrix forming polymer resin may further comprise a plasticizer if needed.

The electrolytic solution according to an embodiment of the present invention may be used for common lithium battery types, such as primary, secondary and sulfur batteries. The electrolytic solution according to an embodiment of the present invention can be used for lithium batteries cylindrical and rectangular.

The present invention will be explained in further detail with reference to the following examples. These examples are for descriptive purpose only, and do not affect the scope of the invention.

EXAMPLES

In the following example, a cathode was manufactured in the following manner. 67.5% by weight of monomer sulphur, 11.4% by weight of ketjenblack and 21.1% by weight of poly(ethyleneoxide) were mixed in an acetonitril solution until a homogeneous solution was obtained. The resulting slurry was cast on an aluminium current collector covered with carbon, and was then dried. After drying, the aluminium current collector was rolled, thus forming a cathode, which had an energy density per unit area of 1.1 mAh/cm$^2$.

In the following example, an electrolyte was manufactured in the following manner. A mixture of methoxyethane, diglyim and dioxolan in a ratio of about 4:4:2 by volume was used as an organic solvent for the electrolyte, and about 1.15 M of LiCF$_3$SO$_3$ was introduced as a lithium salt.

Specific Example 1

An anode substrate was loaded onto a vacuum web coating system including an unwound drive and two deposition areas. A glass plate (3×3 cm$^2$) having a thickness of about 2 mm was employed as an initial substrate. Pure metal (Mg (99.99%), Ni (99.99%), Cu (99.99%), Zn (99.99%), Al (99.99%), and Li (99.99%)) pellet foils were used as a deposition metal source. The chamber was evacuated to a pressure of about 3×10$^{-6}$ torr. A thermal deposition source was heated from stainless steel or molybdenum (with respect to Ni) to deposit all of the metals on the substrate. First a Cu film having a thickness of less than about 2500 Å was deposited on the surface of the glass plate, and then a Li film having a thickness in the range of about 2 μm to about 20 μm was deposited thereon, and then other metals were deposited thereon if needed.

During the deposition process, the thicknesses of films were regulated using a quartz micro balance crystal thickness monitor, and then regulated based on weight after depositing each metal. The rates at which the metals were deposited were in a range of about 15 Å/s to about 65 Å/s (Mg), in the range of about 6 Å/s to about 10 Å/s (Ni), in the range of about 8 Å/s to about 15 Å/s (Cu), in the range of about 10 Å/s to about 25 Å/s (Zn), in the range of about 10 Å/s to about 15 Å/s (Al), and in the range of about 30 Å/s to about 40 Å/s (Li) when the films had a thickness in the range of about 2 μm to about 5 μm thick. However, the rates were greater than about 100 Å/s when the films had a thickness of greater than about 5 μm. The chamber was cooled to a temperature of 25° C. after depositing each metal and before depositing the following metal. Then, a vacuum was formed, then the chamber was filled with air, and then a vacuum was formed again. A cell was manufactured using the cathode, the separator (polyethylene) and the electrolytic solution as described above.

Figure 5A:
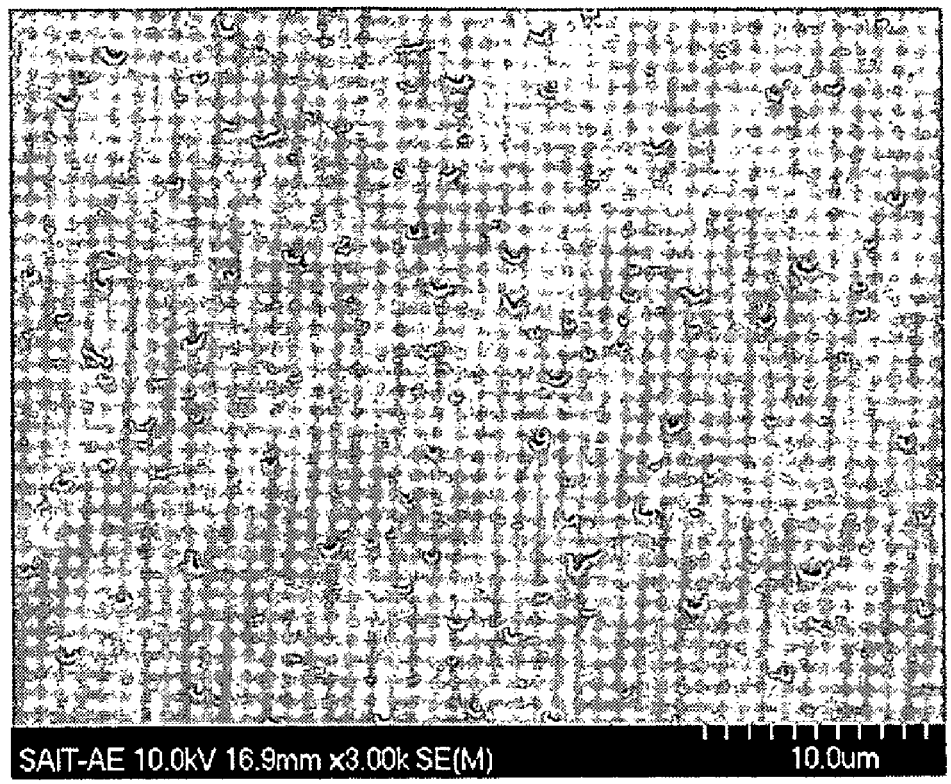
FIG. 5A-5D shows SEM images of deposition surfaces of anodes.
Figure 5B:
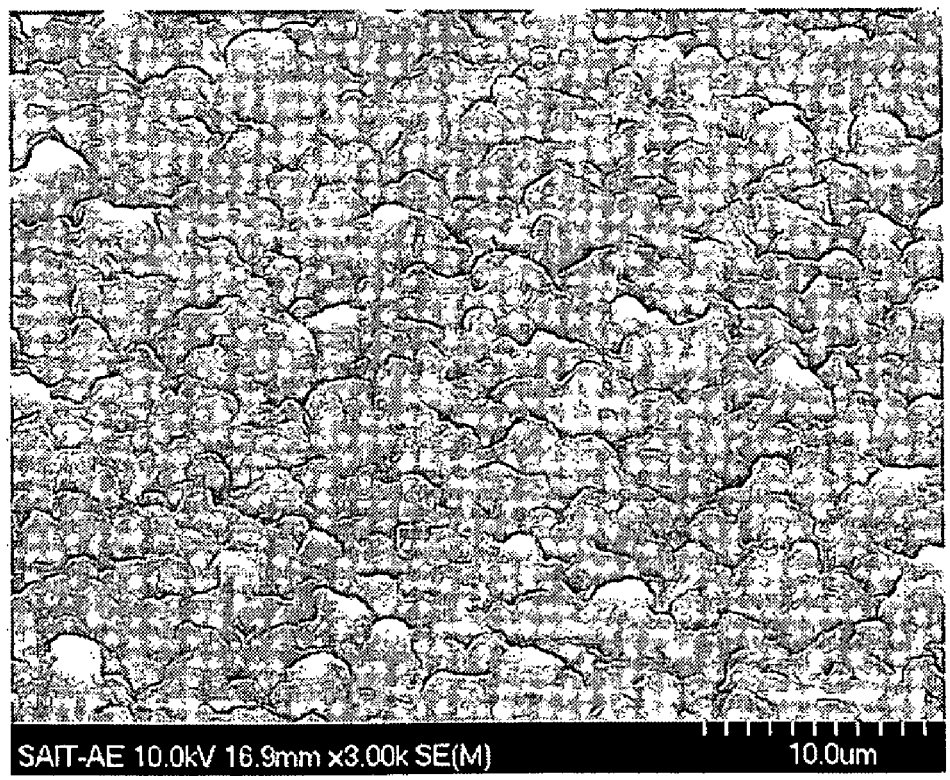
Figure 5C:
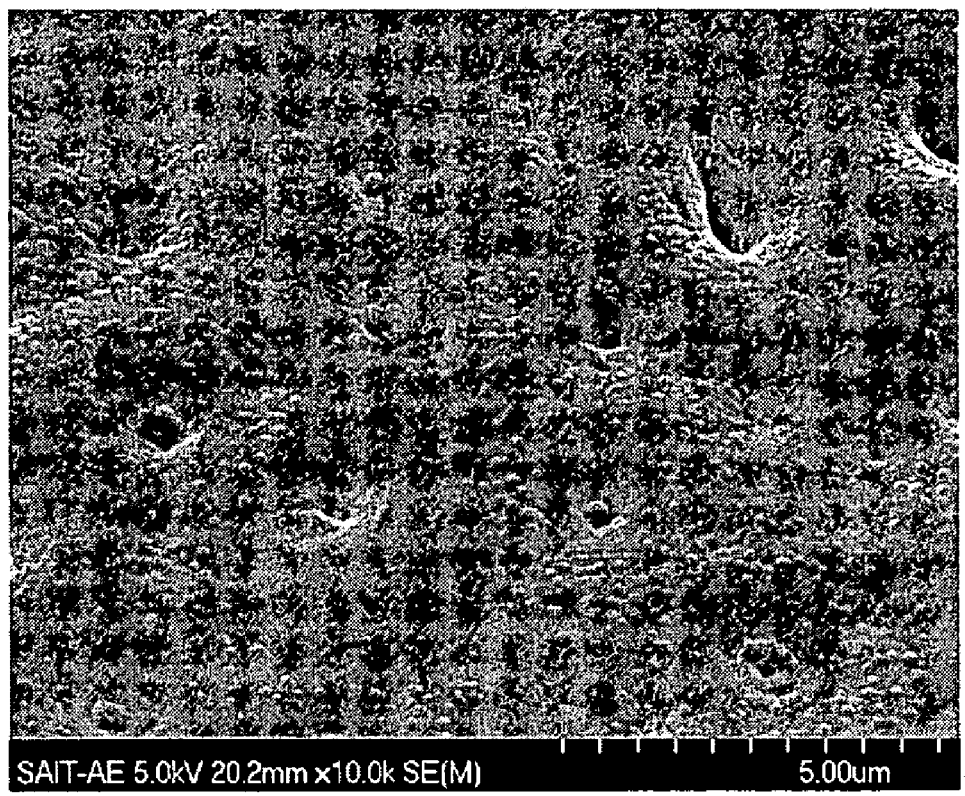
Figure 5D:
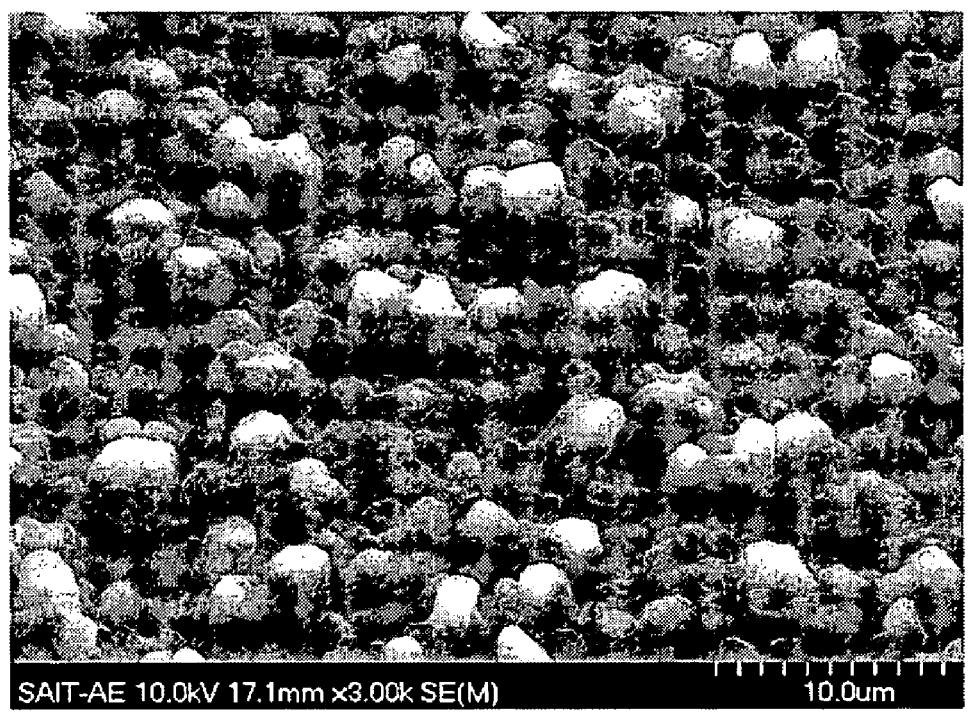

FIG. 5A is a SEM image of the surface of the anode when Cu and lithium were deposited on the glass plate. As seen in FIG. 5A, the surface of the lithium was relatively smooth. FIG. 5B is a SEM image of the surface of the anode when Mg was deposited on the glass plate of FIG. 5A. FIG. 5B shows the formation of a rough surface due to the strong reaction between Mg and the lithium. FIG. 5C is an image of the surface of the anode immediately following the deposition of the intermediate film composed of Cu. The intermediate film which is inert to lithium was formed between the lithium and the Mg. When Cu was used, the surface of the Mg was substantially smooth, contrary to the image of FIG. 5B. Therefore, it was found that the Cu thin film deposited on the metal lithium layer suppressed diffusion of lithium, resulting in a small amount of Mg—Li alloy. FIG. 5D depicts the surface of the anode when the anode of FIG. 5C was allowed to settle for 5 hours. It was found that the lithium was alloyed with Mg due to its diffusion via broken pieces in the Cu layer.

The present invention provides a lithium anode, a method of manufacturing the same and a battery using the anode. The lithium anode may comprise a metal layer (or alloy layer) that is inert to lithium and a metal layer (or alloy layer) that is reactive with lithium. The two layers may form a temporary protective layer on the lithium surface, thus providing a smooth surface. By obtaining the smooth surface, an upper polymer layer and an inorganic layer may be deposited without any difficulty and the adhesive force is strong. Thus, the lithium anode according to an embodiment of the present invention has superior cycling characteristics and improved storage characteristics.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lithium anode, comprising:
a metal lithium layer;
a metal-lithium alloy layer deposited on the metal lithium layer; and
a discontinuous film of a metal inert to lithium interposed between the metal lithium layer and the metal-lithium alloy layer,
wherein pieces of the metal inert to lithium are formed when a porous thin film composed of the metal inert to lithium breaks after settling for a predetermined period of time, and
wherein the metal-lithium alloy layer is formed by alloying the metal lithium layer with a metal layer reactive with lithium deposited on the metal lithium layer when the metal lithium layer diffuses via the pieces of the metal inert to lithium.

2. The lithium anode of claim 1, wherein the metal layer reactive with lithium is one or more materials selected from the group consisting of Mg, Bi, Pb, Cd, Si, In, Ga, Ge, Zn, Al, Sn, Sb and Ag.

3. The lithium anode of claim 1, wherein the metal inert to lithium is one or more materials selected from the group consisting of Cu, Ni, Fe, Ti, Cu—Ni, and Fe—Ni.

4. The lithium anode of claim 1, wherein the total thickness of the metal-lithium alloy and the pieces of the metal inert to lithium is in the range of about 0.05 μm to about 10 μm.

5. The lithium anode of claim 1, wherein the predetermined period of time is in the range of about 5 minutes to about 24 hours.

6. The lithium anode of claim 1, further comprising a polymer protective layer and an inorganic protective layer deposited on the metal-lithium alloy layer.

7. A lithium battery, comprising:
a cathode comprising one or more materials selected from the group consisting of lithium composite oxides, single substance sulfur, casolite in which Li$_2$Sn, where n≧1, is dissolved, organic sulfur, and (C$_2$S$_x$)$_y$, where 2.5<x<20, y>2; and
an anode comprising:
a metal lithium layer;
a metal-lithium alloy layer deposited on the metal lithium layer; and
a discontinuous film of a metal inert to lithium interposed between the metal lithium layer and the metal-lithium alloy layer,
wherein pieces of the metal inert to lithium are formed when a porous thin film composed of the metal inert to lithium breaks after settling for a predetermined period of time, and wherein the metal-lithium alloy layer is formed by alloying the metal lithium layer with a metal layer reactive with lithium deposited on the metal lithium layer when the metal lithium layer diffuses via the pieces of the metal inert to lithium.

8. The lithium battery of claim 7, wherein the metal layer reactive with lithium is one or more materials selected from the group consisting of Mg, Bi, Pb, Cd, Si, In, Ga, Ge, Zn, Al, Sn, Sb and Ag.

9. The lithium battery of claim 7, wherein the metal inert to lithium is one or more materials selected from the group consisting of Cu, Ni, Fe, Ti, Cu—Ni, and Fe—Ni.

10. The lithium battery of claim 7, wherein the total thickness of the metal-lithium alloy and the pieces of the metal inert to lithium is in the range of about 0.05 μm to about 10 μm.

11. The lithium battery of claim 7, wherein the predetermined period of time is in the range of about 5 minutes to about 24 hours.

12. The lithium battery of claim 7, further comprising a polymer protective layer and an inorganic protective layer deposited on the metal-lithium alloy layer.

* * * * *